UNITED STATES PATENT OFFICE.

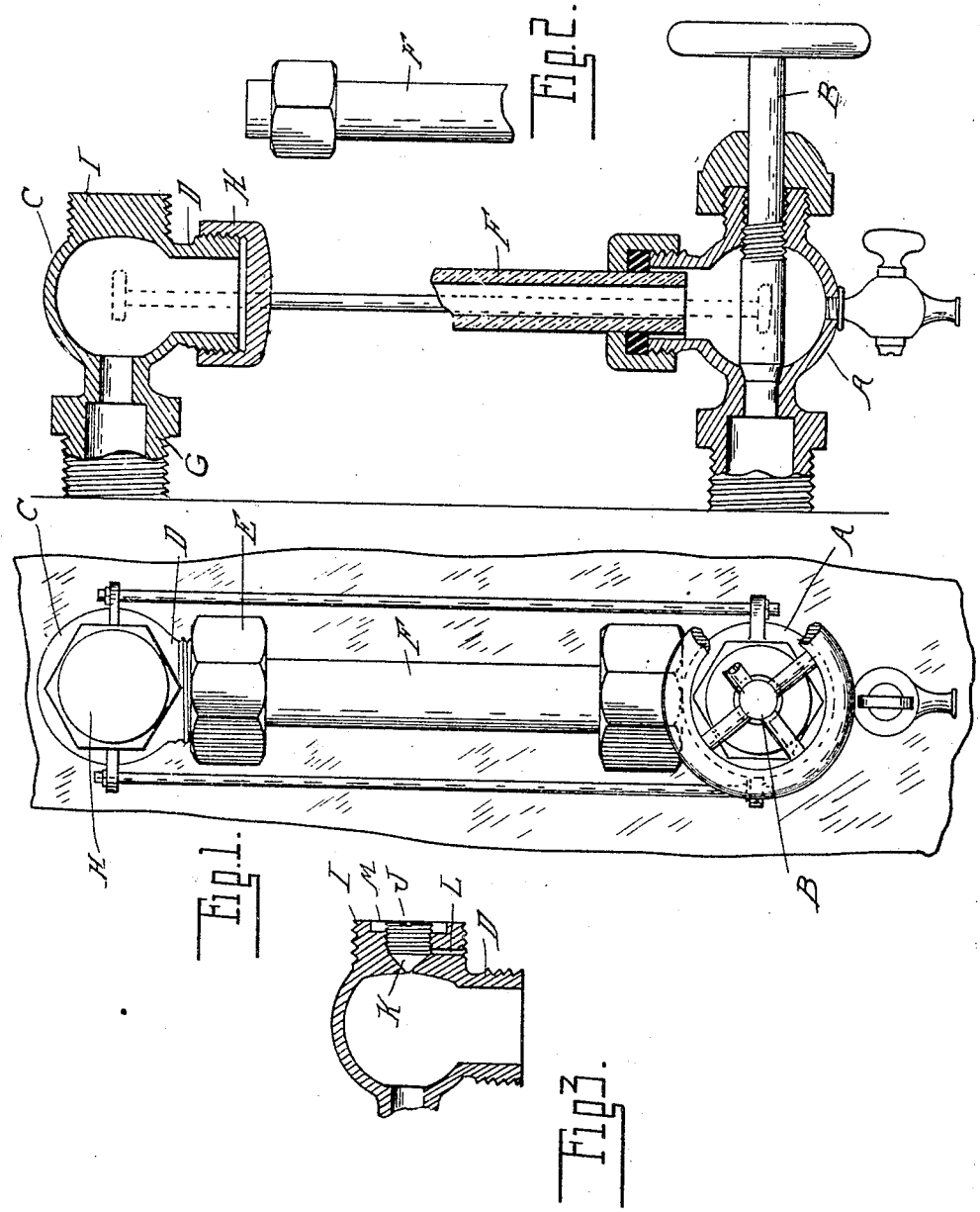

EARL W. ROBERTS, OF DETROIT, MICHIGAN, ASSIGNOR TO THE ROBERTS BRASS MANUFACTURING COMPANY, OF DETROIT, MICHIGAN, A CORPORATION OF MICHIGAN.

GAGE-GLASS FITTING.

1,056,304.   Specification of Letters Patent.   Patented Mar. 18, 1913.

Application filed May 29, 1911. Serial No. 630,154.

*To all whom it may concern:*

Be it known that I, EARL W. ROBERTS, a citizen of the United States of America, residing at Detroit, in the county of Wayne and State of Michigan, have invented certain new and useful Improvements in Gage-Glass Fittings, of which the following is a specification, reference being had therein to the accompanying drawings.

The invention relates to gage glasses more particularly designed for use on steam boilers of low pressure steam systems and pneumatic service systems, and it is the object of the invention to provide means for sealing the fitting in case of the breaking of the glass without the use of a shut-off valve.

To this end the invention consists in the construction as hereinafter set forth.

In the drawings,—Figure 1 is a front elevation of a gage to which my improvement is applied; Fig. 2 is a vertical longitudinal section showing the glass as broken and the fitting sealed; Fig. 3 is a section similar to Fig. 2 showing a modified construction.

In the usual construction of gages for steam boilers the glass is secured to two fittings upon the boiler at different elevations, each of said fittings being usually provided with a shut-off valve. The lower fitting is below the normal water line of the boiler and consequently the valve is sealed by a water packing. On the other hand the upper fitting communicates with the steam space of the boiler and it is difficult to maintain a tightly packed valve which will avoid leakage of steam. Inasmuch as the only function of the valve is to close the fitting when the glass is broken, this defect may be remedied by dispensing with the valve and providing other sealing or closing means for the fitting when the glass is broken. This I preferably accomplish by employing a valveless fitting with a sealing cap for the gage nipple detachably mounted thereon and in condition to be applied whenever needed.

In detail A is the lower fitting of the gage provided with a valve B of ordinary construction.

C is the upper fitting having the downwardly projecting nipple D to which the packing gland E for securing the gage glass F is normally secured. The fitting C is formed without a valve and is imperforate with the exception of the openings through the nipple D and the nipple G which engages the boiler. Thus under normal conditions there is no opportunity for escape of steam if the gland E is properly packed.

To provide for closing the fitting in case of the breakage of the glass, a cap H for engaging the nipple D is provided and is detachably mounted upon the fitting C. This mounting preferably consists of a threaded stud I projecting laterally from the fitting and with which the cap H is normally engaged. This stud not only forms a means of securing the cap but also protects the threads thereof so as to be in condition for engagement with the nipple D whenever needed.

In use, whenever the glass is broken the gland E may be detached from the nipple D and the cap H may then be disengaged from the stud I and secured upon the nipple D. This will completely seal the upper fitting, while the valve B may be used for closing the lower fitting in the usual manner.

With certain systems, such for instance as vacuum steam systems, it is desirable at times to provide an air vent. A pet-cock may be employed for this purpose but is open to the objection that it frequently becomes leaky. I have therefore devised a construction of venting which consists of a screw-plug J engaging a threaded socket and having a conical nut or needle K for controlling a vent L. This plug J is located in the threaded nipple I and the latter is recessed at M to provide clearance for the head of the screw. The plug is normally seated so as to close the vent L and as a further protection against leakage the cap H engaging the nipple I forms an auxiliary closure. When, however, it is desired to vent the system the cap H is removed, and the plug J loosened, which opens the vent L.

What I claim as my invention is:

1. In a gage, the combination with a gage glass and a fitting having a gland nipple for engagement with a glass, a cap threaded to engage the nipple, adapted to close the latter when the glass is removed and a threaded bearing on said fitting with which said cap is normally engaged.

2. In a gage, the combination with a fitting having a gland nipple, a gage glass engaging the nipple, of a cap for closing said gland nipple, a vent plug engaging said fitting, and a threaded bearing for normally receiving said cap in a position to form a second closure for said vent plug.

3. In a gage, the combination with a fitting having a gland nipple, a gage glass engaging the nipple, of a cap for closing said gland nipple detachably mounted on said fitting, and a vent plug engaging a bearing in said fitting normally covered by said cap.

4. In a gage, the combination with a fitting having a gland nipple, a gage glass engaging the nipple, of a cap for closing said gland nipple detachably mounted on said fitting, a recess in the bearing with which said cap is detachably engaged, and a vent plug engaging said recess.

In testimony whereof I affix my signature in presence of two witnesses.

EARL W. ROBERTS.

Witnesses:
JAMES P. BARRY,
H. J. BELKNAP.